US012769527B2

(12) United States Patent
Jo et al.

(10) Patent No.: US 12,769,527 B2
(45) Date of Patent: Oct. 20, 2026

(54) METHOD AND APPARATUS FOR COMPILING FOR OVERLAPPING INSTRUCTIONS ON MULTIPLE PROCESSORS

(71) Applicant: MOREH CORP., Seoul (KR)

(72) Inventors: Gangwon Jo, Seoul (KR); Jungho Park, Seoul (KR)

(73) Assignee: MOREH CORP., Seoul (KR)

( * ) Notice: Subject to any disclaimer, the term of this patent is extended or adjusted under 35 U.S.C. 154(b) by 79 days.

(21) Appl. No.: 18/423,642

(22) Filed: Jan. 26, 2024

(65) Prior Publication Data

US 2024/0303083 A1 Sep. 12, 2024

(30) Foreign Application Priority Data

Mar. 6, 2023 (KR) ........................ 10-2023-0029483
Aug. 10, 2023 (KR) ........................ 10-2023-0104670

(51) Int. Cl.

| | |
|---|---|
| ***G06F 9/38*** | (2018.01) |
| ***G06F 8/41*** | (2018.01) |
| ***G06F 11/14*** | (2006.01) |
| ***G06F 11/20*** | (2006.01) |
| ***G06F 11/30*** | (2006.01) |

(52) U.S. Cl.

CPC ................ *G06F 8/45* (2013.01); *G06F 8/443* (2013.01); *G06F 11/1407* (2013.01); *G06F 11/143* (2013.01); *G06F 11/1438* (2013.01); *G06F 11/2025* (2013.01); *G06F 11/2028* (2013.01); *G06F 11/203* (2013.01); *G06F 11/302* (2013.01)

(58) Field of Classification Search

CPC .......... G06F 8/456; G06F 8/433; G06F 8/445; G06F 9/3836

See application file for complete search history.

(56) References Cited

U.S. PATENT DOCUMENTS

| | | | | |
|---|---|---|---|---|
| 5,452,461 A * | 9/1995 | Umekita | G06F 8/45 | 717/149 |
| 8,799,884 B2 * | 8/2014 | Dreyer | G06F 8/456 | 712/203 |
| 11,789,710 B2 * | 10/2023 | Jung | G06F 8/443 | 717/151 |
| 2001/0003187 A1 * | 6/2001 | Aoki | G06F 8/456 | 718/104 |
| 2010/0107147 A1 * | 4/2010 | Cha | G06F 8/443 | 717/161 |
| 2018/0157471 A1 | 6/2018 | Venkataramani et al. | | |
| 2020/0241856 A1 * | 7/2020 | Kim | G06N 3/063 | |

FOREIGN PATENT DOCUMENTS

KR 10-2020-0093105 A 8/2020

* cited by examiner

*Primary Examiner* — Jacob Petranek
(74) *Attorney, Agent, or Firm* — Banner & Witcoff, Ltd.

(57) ABSTRACT

A method for compiling for overlapping instructions between a plurality of processors is provided, which is performed by one or more processors, and includes receiving a source program, determining a plurality of instructions to be executed in the plurality of processors based on the source program, and assigning the plurality of instructions to the plurality of processors such that a first portion of the plurality of instructions and a second portion of the plurality of instructions are processed in parallel by each of the plurality of processors.

20 Claims, 10 Drawing Sheets

700

710

800

810

METHOD AND APPARATUS FOR COMPILING FOR OVERLAPPING INSTRUCTIONS ON MULTIPLE PROCESSORS

CROSS-REFERENCE TO RELATED APPLICATION

This application claims priority under 35 U.S.C § 119 to Korean Patent Application No. 10-2023-0029483 and No. 10-2023-0104670, filed in the Korean Intellectual Property Office on Mar. 6, 2023 and Aug. 10, 2023, respectively, the entire contents of which are hereby incorporated by reference.

TECHNICAL FIELD

The present disclosure relates to a method and device for compiling for overlapping instructions between a plurality of processors, and more particularly, to a method and device for assigning a plurality of instructions to a plurality of processors such that a plurality of instructions determined based on a source program are processed in parallel.

BACKGROUND

A compiler is a language translation program that converts codes written in a specific programming language into another language (e.g., machine language) that can be read by a computer processor. A general compiler performs the process of converting a specific programming language into another language by sequentially analyzing the vocabulary, syntax, and semantics of a source program, generating an intermediate representation such as intermediate code, optimizing the code, and generating an object code. In the field of compiler technology, technological advances have been made to improve the speed and efficiency of target programs by optimizing this conversion process.

Meanwhile, the parallel computing is a computing method in which multiple processing units participate in problem solving at the same time to quickly complete a given task, and is widely used in various fields (e.g., machine learning, image processing, etc.) that require high-performance computing, complex problem solving, and large amount of data processing, and is attracting attention as one of the most powerful paradigms in computer architecture.

However, existing compiler technologies have difficulty extracting and managing parallelism in the field of parallel computing, where sub-tasks are processed simultaneously in a plurality of processors or cores. For example, existing compiler technologies have difficulty identifying potential parallelism in source code. In addition, when managing communication and synchronization between simultaneously processed tasks, there is a problem that communication overhead between processors can be excessive, which may degrade the performance of the processor.

Accordingly, there is a need for an advanced compiler technology that effectively identifies and extracts parallelism from a source program etc. and efficiently manages communication and synchronization between tasks.

SUMMARY

In order to solve one or more problems (e.g., the problems described above and/or other problems not explicitly described herein), the present disclosure provides a method, a recording medium and a system (apparatus) for compiling for overlapping instructions between a plurality of processors.

The present disclosure may be implemented in a variety of ways, including a method, a system (device), or a computer program stored in a readable storage medium.

A method for compiling for overlapping instructions between a plurality of processors may be performed by one or more processors and include receiving a source program, determining a plurality of instructions to be executed in the plurality of processors based on the source program, and assigning the plurality of instructions to the plurality of processors such that a first portion of the plurality of instructions and a second portion of the plurality of instructions are processed in parallel by each of the plurality of processors.

The method may further include determining dependency between the plurality of instructions to be executed, in which the assigning the plurality of instructions to the plurality of processors may include assigning the plurality of instructions to the plurality of processors based on the determined dependency.

The assigning the plurality of instructions to the plurality of processors based on the determined dependency may include assigning a first instruction of the plurality of instructions and a second instruction of the plurality of instructions which is not dependent on the first instruction to a plurality of processors such that the first instruction and the second instruction are processed in parallel by each of the plurality of processors.

The determining dependency between the plurality of instructions to be executed may include determining an intermediate representation associated with the plurality of instructions to be executed, and determining the dependency between the instructions to be executed based on the intermediate representation.

The intermediate representation may include information associated with a predetermined number of instructions of the plurality of instructions to be executed.

The intermediate representation may be an intermediate representation graph associated with the plurality of instructions to be executed.

The method may include classifying at least a portion of the plurality of instructions to be executed into an operation instruction, and a communication instruction associated with data transmission and reception between the plurality of processors, in which the assigning the plurality of instructions to the plurality of processors may include assigning the operation instruction and the communication instruction to the plurality of processors such that a third portion of the operation instruction and a fourth portion of the communication instruction are processed in parallel by each of the plurality of processors.

The determining the plurality of instructions may include determining the plurality of instructions based on parallelism.

A computer-readable non-transitory recording medium storing instructions for executing the method described above on a computer is provided.

An information processing system may be provided, which may include a communication module, a memory, and one or more processors connected to the memory and configured to execute one or more computer-readable programs included in the memory, in which the one or more programs may further include instructions for receiving a source program, determining a plurality of instructions to be executed in the plurality of processors based on the source program, and assigning the plurality of instructions to the plurality of processors such that a first portion of the plurality of instructions and a second portion of the plurality of instructions are processed in parallel by each of the plurality of processors.

According to various examples of the present disclosure, communication overhead between processors can be minimized by efficiently processing a plurality of instructions in parallel.

According to various examples of the present disclosure, communication instructions and operation instructions can be executed in parallel in a plurality of processors, so that overall performance of the program can be improved.

According to various examples of the present disclosure, parallelism between instructions can be effectively identified or determined, and communication and synchronization between tasks processed in the processors can be efficiently managed.

According to various examples of the present disclosure, because the instructions are determined by parallelism, the number of instructions of the instructions generated based on the source program, which are not dependent on each other can increase, and the number of instructions and/or combinations of instructions that may be processed in parallel can increase.

According to various examples of the present disclosure, by reducing unnecessary synchronization through rearrangement of intermediate representation graphs, costs such as resource consumption due to synchronization can be reduced.

The effects of the present disclosure are not limited to the effects described above, and other effects not described herein can be clearly understood by those of ordinary skill in the art (hereinafter referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
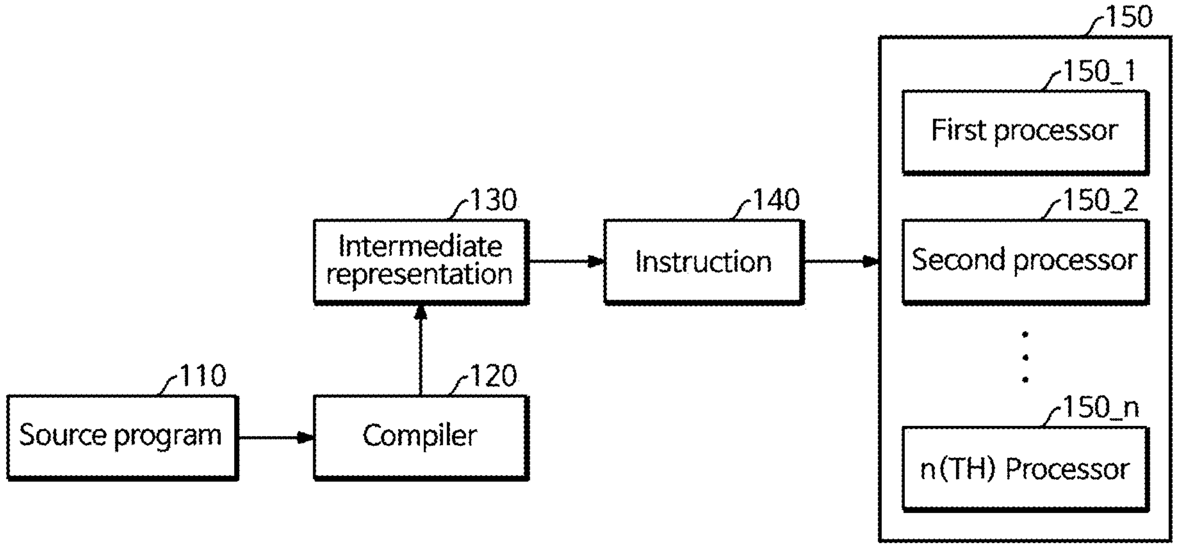
FIG. 1 is a diagram illustrating an example in which instructions determined from a source program is assigned to a plurality of processors.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the disclosure is not limited to the examples disclosed below, and may be implemented in various forms different from each other, and the examples are merely provided to make the disclosure complete, and to fully disclose the scope of the disclosure to those skilled in the art to which the disclosure pertains.

The terms used herein will be briefly described prior to describing the disclosed example(s) in detail. The terms used herein have been selected as general terms which are widely used at present in consideration of the functions of the disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the disclosure should be defined based on the meaning of the terms and the overall content of the disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a Central Processing Unit (CPU), a microprocessor, a Digital Signal Processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "node" may refer to a device or component that participates in operation, communication, resource management, etc. of a system within a network or system that performs a specific task or function. For example, the node may include physical servers, virtual machines, storage devices, network switches, routers, or other computing elements which are interconnected to each other and work together to provide services, to share resources, to process data, etc.

In the present disclosure, a "source program" may refer to a collection of instructions written in a programming language designed to perform a specific task. For example, the source program may be written to perform a deep learning task, and the referenced data may be implemented with any data type (e.g., tensor type data, etc.) that may form a deep learning program. The source program may form the original and primary output of the programming process and may be converted into machine code through a compilation process or interpreted directly at run time. The source program may be written across multiple files and may include code libraries and dependencies.

In the present disclosure, "intermediate representation" may refer to a graph having the same meaning as a program and/or information associated with the same, which is generated to efficiently execute a program. The intermediate representation may include one or more nodes and one or more edges.

FIG. 1 is a diagram illustrating an example in which an instruction 140 determined from a source program 110 is assigned to a set of processors 150.

A compiler 120 may determine an intermediate representation 130 based on the source program 110. For example, in the compiler 120, the intermediate representation 130 may be determined, and the determined intermediate representation 130 may be translated into an object code for a specific machine, such that the instruction 140 to be executed in the set of processors 150 may be determined. The instruction 140 may include a plurality of instructions. For example, if the source program 110 includes instructions associated with training and/or reasoning of an artificial neural network model, the instruction 140 is a plurality of operation instructions that may be processed by a processor (e.g., an accelerator, etc.), a plurality of communication instructions, etc.

The instruction 140 may be determined to be processed in parallel in each of a plurality of processors 150_1 to **150_*n* in the set of processors 150 using parallelism. The instruction 140 may be determined to be processed in parallel in each of the plurality of processors 150_1 to 150_*n* in the set of processors 150 using model parallelism. Additionally or alternatively, the determined instruction 140 may be processed in parallel in each of the plurality of processors 150_1 to 150_*n* in the set of processors 150 using pipeline parallelism in which a layer of a model is divided and processed by each of a plurality of processors. Additionally or alternatively, the determined instruction 140 may be processed in parallel in each of the plurality of processors 150_1 to 150_*n* in the set of processors 150 using a data parallelism technique such as tensor parallelism in which a tensor of a model is divided and processed by each of a plurality of processors. For example, the instruction 140 may be processed in parallel in each of the plurality of processors 150_1 to 150_*n* in the set of processors 150** using data parallelism in which an input tensor is divided and inputted.

Since the instructions are processed in parallel using the parallelism technique described above, the number of instructions of the instructions 140 generated based on the source program 110, which are not dependent on each other may increase, and the number of instructions and/or combinations of instructions processable in parallel may increase.

The intermediate representation 130 may be determined as various forms of data structures or codes. For example, the intermediate representation 130 may be an intermediate representation graph associated with the instruction 140, but is not limited thereto.

Each of the intermediate representations 130 may include information associated with a predetermined number (e.g., 5000 or 10000) of instructions of a plurality of instructions 140, data, memory, etc.

For example, the intermediate representation 130 may include nodes representing program operations, instructions, variables, constants, etc., edges representing dependency and/or connectivity between nodes, control flow information including information on program's control flow such as conditional branches (if-else statements, etc.), loops (for, while, etc.) and function calls/returns, memory access information such as data loading and storage, and type and attribute information of each node, etc.

The instructions 140 may be assigned to the set of processors 150 based on dependency between the instructions 140. Each of the plurality of processors 150_1 to **150_*n* in the set of processors 150 assigned with each of the instructions 140** may refer to any processor that performs instruction operation and/or processing, such as, for example, a central processing unit (CPU), a graphics processing unit (GPU), a core included in a processing unit, or a group or node including a plurality of processing units, but is not limited thereto.

A first instruction and a second instruction may be assigned to the set of processors 150 such that, the first instruction of the instructions 140 and the second instruction of the instructions 140 which is not dependent on the first instruction are processed in parallel by each of the plurality of processors 150_1 to **150_*n* in the set of processors 150**.

For example, the first instruction may be assigned to the first processor 150_1 and the second instruction may be assigned to the second processor 150_2 so that the first instruction and the second instruction may be processed in parallel through the first processor 150_1 and the second processor 150_2. With this configuration, communication overhead between the processors 150_1 to **150_*n*** can be minimized.

Dependency between the instructions 140 may be determined based on the intermediate representation 130. If each of the intermediate representations 130 includes information associated with a predetermined number (e.g., 100) of instructions of the instructions 140, dependency between each of the intermediate representations 130 and associated instructions may be determined.

If the execution or result of a specific instruction is affected by the result of another instruction, or if the input of a specific instruction corresponds to the execution result of another instruction, it may be determined that the specific instruction is dependent on another instruction.

For example, if it is determined that there is data dependency such as RAW (Read-After-Write), WAR (Write-After-Read), WAW (Write-After-Write) between instructions, or control dependency in which the execution of an instruction depends on a result of a previous instruction (e.g., if-else configuration), or resource dependency in which an instruction is dependent on a specific hardware resource, etc., it may be determined that there is dependency between instructions.

Details of a process for determining the dependency between the instructions 140 will be described below in detail with reference to FIGS. 4 and 5.

As the intermediate representation 130 includes information associated with more instructions, the number of instructions that do not have dependency between the instructions associated with the intermediate representation 130 increases, so that the number or frequency of possible parallel processing of the instructions increases, thereby enhancing work efficiency of the set of processors 150. Accordingly, it is preferable that the intermediate representation 130 includes information associated with as many instructions as possible, provided that costs etc. additionally required for the dependency determination, the intermediate representation generation, processing, etc. accompanying the increased amount of information associated with the instructions included in the intermediate representation 130 do not exceed a certain limit.

The instructions may be assigned to each of the processors 150_1 to **150_*n*** such that instructions having dependency are sequentially executed. For example, if the second instruction is dependent on the first instruction and the third instruction is dependent on the second instruction, the instructions may be assigned to the processor so as to be executed in the order of the first instruction, the second instruction, and the third instruction.

Figure 2:
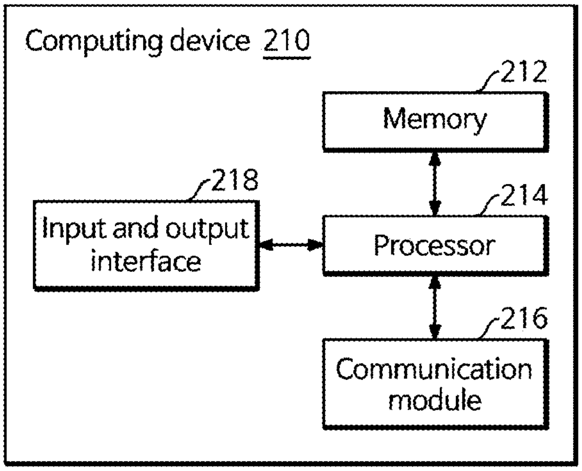
FIG. 2 is a block diagram of an internal configuration of a computing device.

FIG. 2 is a block diagram of an internal configuration of a computing device 210.

The computing device 210 may include a memory 212, a processor 214, a communication module 216, and an input and output interface 218. As illustrated in FIG. 2, the computing device 210 may be configured to communicate information, data, etc. through a network by using the communication module 216.

The computing device 210 may correspond to a user terminal or an information processing system, and it may be configured such that one of the user terminal or the information processing system is able to communicate information, data, etc. with the other via a network using the communication module 216.

The memory 212 may include any non-transitory computer-readable recording medium. The memory 212 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, etc. may be included in the computing device 210 as a separate permanent storage device that is separate from the memory. In addition, an operating system and at least one program code may be stored in the memory 212.

These software components may be loaded from a computer-readable recording medium separate from the memory 212. Such a separate computer-readable recording medium may include a recording medium directly connectable to the computing device 210, and may include a computer-readable recording medium such as a floppy drive, a disk, a tape, a DVD/CD-ROM drive, a memory card, etc., for example. In another example, the software components may be loaded into the memory 212 through the communication module 216 rather than the computer-readable recording medium. For example, at least one program may be loaded into the memories 212 based on a computer program installed by files provided by developers or a file distribution system that distributes an installation file of an application through the communication module 216.

The processor 214 may be configured to process the commands of the computer program by performing basic arithmetic, logic, and input and output calculations. The commands may be provided to a user terminal (not illustrated) or another external system by the memory 212 or the communication module 216. In addition, the processor 214 may be configured to manage, process, and/or store the information and/or data received from a plurality of user terminals and/or a plurality of external systems.

The processor 214 may determine a plurality of instructions to be executed on the plurality of processors based on the source program. That is, a compiler may be operated in the processor 214. The processor 214 may assign the plurality of instructions to a plurality of processors (e.g., accelerators, etc.) such that a first portion of the plurality of instructions and a second portion of the plurality of instructions are processed in parallel by each of the plurality of processors.

For example, the processor 214 may assign a plurality of instructions to a plurality of processors based on the determined dependency. For example, the processor may assign the first instruction and the second instruction to a plurality of processors such that the first instruction of the plurality of instructions and the second instruction of the plurality of instructions which is not dependent on the first instruction are processed in parallel by each of the plurality of processors.

The processor 214 may determine an intermediate representation including information associated with a predetermined number of instructions of a plurality of instructions to be executed, and determine dependency between the instructions to be executed based on the intermediate representation.

The processor 214 may classify at least a portion of the plurality of instructions to be executed into an operation instruction, and a communication instruction associated with data transmission and reception between the plurality of processors. The processor 214 may assign the operation instruction and the communication instruction to the plurality of processors such that a third portion of the operation instruction and a fourth portion of the communication instruction are processed in parallel by each of the plurality of processors.

The communication module 216 may provide a configuration or function for the user terminal (not illustrated) and the computing device 210 to communicate with each other through a network, and may provide a configuration or function for the computing device 210 to communicate with an external system (e.g., a separate cloud system). For example, control signals, commands, data, etc. provided under the control of the processor 214 of the computing device 210 may be transmitted to the user terminal, the external system (e.g., a parallel computing system), etc. through the communication module 216 and the network through the communication module of the user terminal, external system, etc.

In addition, the input and output interface 218 of the computing device 210 may serve as a means for interfacing with a device (not illustrated) for input or output which may be connected to or included in the computing device 210. In FIG. 2, the input and output interface 218 is illustrated as a component configured separately from the processor 214, but aspects are not limited thereto, and the input and output interface 218 may be configured to be included in the processor 214.

The computing device 210 may receive a source program from a user (user terminal) through the input and output interface 218. Alternatively, the computing device 210 may also receive the source program through the communication module 216.

The computing device 210 may include more components than those illustrated in FIG. 2. Meanwhile, most of the related components may not necessarily require exact illustration.

Figure 3:
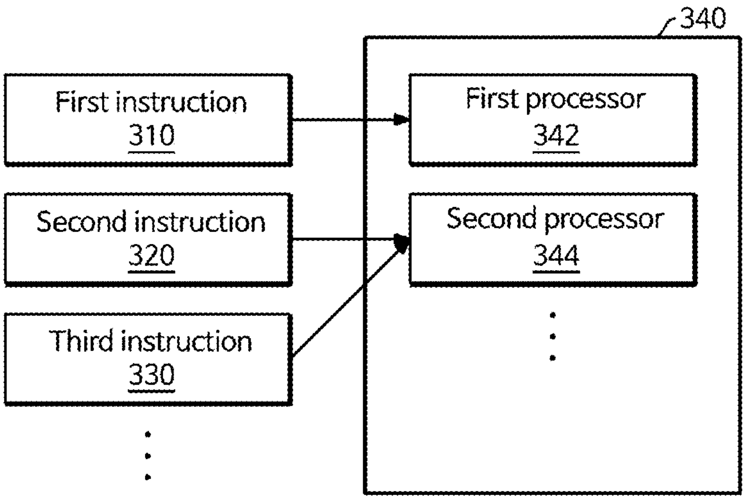
FIG. 3 is a diagram illustrating an example in which instructions are assigned to a plurality of processors.

FIG. 3 is a diagram illustrating an example in which instructions 310, 320, and 330 are assigned to a set of processors 340. The instructions 310, 320, and 330 assigned to the set of processors 340 may be determined by a compiler based on a source program.

Each of the processors in the set of processors 340 is a Central Processing Unit (CPU), Graphics Processing Unit (GPU), Tensor Processing Unit (TPU), Field Programmable Gate Array (FPGA), Application-Specific Integrated Circuit (ASIC), a core included in a processing unit, a group or node including a plurality of processing units, etc., but is not limited thereto. For example, the set of processors 340 may be a multicore processor, and each of a first processor 342 and a second processor 344 may be an individual core included in the multicore processor.

Each of the processors in the set of processors 340 does not necessarily correspond to the same type of processor. For example, the set of processors 340 may correspond to a heterogeneous computing system and may include different types of processors such as a CPU, a GPU, etc.

Two processors are illustrated in FIG. 3, but aspects are not limited thereto. The set of processors 340 may include any number of processors, and each of the processors included in the set of processors 340 may operate in parallel and transfer and receive data or tasks to and from the other processors.

The instructions 310, 320, and 330 may include instructions for any operation associated with machine learning models (e.g., artificial neural network models, etc.), instructions for communication, etc. For example, the instruction for operation may be an instruction for operation performed in each layer included in the artificial neural network model. For example, the instructions 310, 320, and 330 may include addition, subtraction, maximum value computation, minimum value computation, floating point multiplication, weighting, convolution, matrix multiplication, batch normalization, Rectified Linear Unit (ReLU), pooling, Long ShortTerm Memory (LSTM) operation, Gated Recurrent Unit (GRU) operation, etc., which may be performed in a layer included in the artificial neural network model, but are not limited thereto. In addition, the instruction for communication may include instructions for communication between a plurality of accelerators that process instructions for operation, instructions for communication between a plurality of accelerators and CPU, communication between nodes, etc.

The instructions 310, 320, and 330 may be assigned to the set of processors 340 to be processed in parallel by each of the processors included in the set of processors 340. For example, the first instruction 310 may be assigned to the first processor 342 and the second instruction 320 and the third instruction 330 may be assigned to the second processor 344, so that each of the instructions 310, 320, and 330 may be processed in parallel in the set of processors 340.

The instructions 310, 320, and 330 may be assigned to the set of processors 340 based on the dependency between the instructions 310, 320, and 330.

For example, due to the first instruction 310 not being dependent on the second instruction 320 and the third instruction 330, the first instruction 310 may be assigned to the first processor 342 different from the second processor 344 to which the second instruction 320 and the third instruction 330 are assigned.

For example, if the first instruction 310 is an instruction associated with data A, and the second instruction 320 and the third instruction 330 are instructions associated with data B, the first instruction 310 may not necessarily have to be executed before or after the second instruction 320 and the third instruction 330. In this case, the first instruction 310 may not be dependent on the second instruction 320 and the third instruction 330.

On the other hand, due to either the second instruction 320 or the third instruction 330 being dependent on the other, the second instruction 320 and the third instruction 330 may be assigned to the same processor 344.

For example, since both the second instruction 320 and the third instruction 330 correspond to an instruction associated with the data A, one of the second instruction 320 and the third instruction 330 may have to be executed before the other. In this case, one of the second instruction 320 and the third instruction 330 may be dependent on the other.

In this way, because each of the instructions is assigned to the set of processors 340 based on whether or not there is dependency between the instructions, communication overhead due to data transmission and reception between the processors in the set of processors 340 can be minimized.

At least a portion of the instructions 310, 320, and 330 may be classified into the operation instruction, and the communication instruction associated with data transmission and reception between a plurality of processors, and the operation instruction and the communication instruction may be assigned to the set of processors 340 such that a portion of the operation instructions and a portion of the communication instructions may be processed in parallel by each of the set of processors 340. The operation instruction may include calculation instruction.

For example, the first instruction 310 may be an operation instruction, and the second instruction 320 may be a communication instruction (e.g., a communication instruction etc. not dependent on the first instruction 310). Accordingly, the first instruction 310 may be assigned to the first processor 342, and the second instruction 320 may be assigned to the second processor 344 etc. different from the first processor 342.

The communication instructions and the operation instructions may be assigned to each of the plurality of processors in the set of processors 340 through different threads and/or different command queues corresponding to each of the plurality of processors in the set of processors 340 and processed. With this configuration, the communication instructions and the operation instructions can be executed in parallel in a plurality of processors, so that overall performance of the program can be improved.

Figure 4:
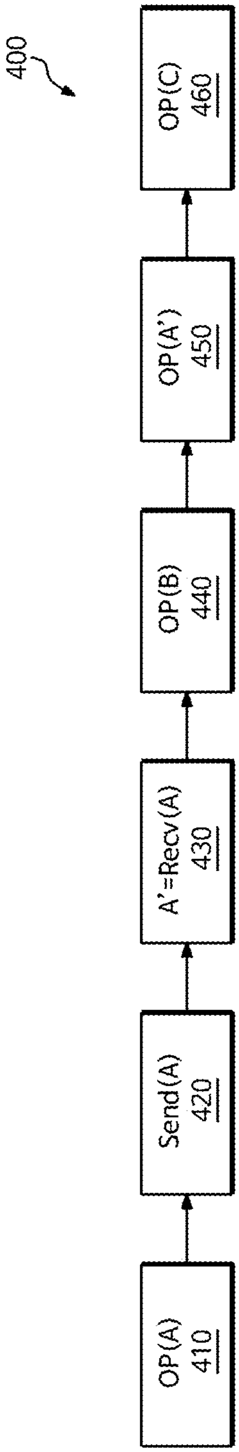
FIG. 4 is a diagram illustrating an example of an intermediate representation graph associated with a plurality of instructions.

FIG. 4 is a diagram illustrating an example of an intermediate representation graph 400 associated with a plurality of instructions.

The intermediate representation graph 400 may be generated based on a source program. For example, the intermediate representation graph 400 may be generated by converting an intermediate code generated based on a source program into a graph form in the compiling process. The intermediate representation graph 400 may include information associated with a predetermined number (e.g., 100) of instructions.

The intermediate representation graph 400 may include nodes representing program operations, instructions, variables, constants, etc., edges representing dependency and/or connectivity between nodes, control flow information including information on program's control flow such as conditional branches (if-else statements, etc.), loops (for, while, etc.) and function calls/returns, memory access information such as data loading and storage, and type and attribute information of each node, etc.

For example, the intermediate representation graph 400 illustrated in FIG. 4 includes information associated with six instructions 410, 420, 430, 440, 450, and 460. As the intermediate representation graph 400 includes information associated with more instructions, the number of instructions that have no dependency between the instructions associated with the intermediate representation graph 400 increases, and thus the number or frequency of parallel processing of the instructions may increase.

The dependency between the intermediate representation graph 400 and the associated instructions 410, 420, 430, 440, 450, and 460 may be determined based on the intermediate representation graph 400 generated based on the source program.

If the execution or result of a specific instruction is affected by the result of another instruction, or if the input of a specific instruction corresponds to the execution result of another instruction, it may be determined that the specific instruction is dependent on another instruction.

For example, if it is determined that there is data dependency such as RAW (Read-After-Write), WAR (Write-After-Read), and WAW (Write-After-Write) between the instructions, it may be determined that a specific instruction is dependent on another instruction.

For example, to use a in the second operation instruction in the code snippet "a=b+c; d=a+e,", a has to be calculated first (RAW), and for the second operation instruction in the code snippet "a=b+c; b=d+e;", the second operation instruction writes operation result to b after the first operation instruction reads b (WAR), and two operation instructions in the code snippet "a=b+c; a=d+e;" are both operations that write to a (WAW). Accordingly, the second operation instruction in each of the three code snippets described above may be determined to be dependent on the first operation instruction.

Additionally or alternatively, if it is determined that there is control dependency, according to which the execution of an instruction depends on the result of a previous instruction, it may be determined that the instruction is dependent. For example, in if-else structure, since the execution of instruction positioned in the else block differs according to the result of the instructions in the if block, it may be determined that there is control dependency.

Additionally or alternatively, when it is determined that there is resource dependency, according to which the instructions depend on a specific hardware resource, it may be determined that the instructions have dependency. For example, when two instructions use an arithmetic logic unit (ALU) of a processor at the same time, the instructions may be determined to be dependent.

For example, the first instruction 410 of FIG. 4 may be an operation instruction for data A, the second instruction 420 may be an instruction for transferring the data A to another node or processor, etc., and the third instruction 430 may be an instruction for receiving the data A transferred from the second instruction 420 and storing it as A'. In this case, each of the first instruction 410, the second instruction 420, and the third instruction 430 is associated with the data A, the second instruction 420 is dependent on the first instruction 410 and the third instruction 430 is dependent on the second instruction 420.

Meanwhile, the fifth instruction 450 may be an operation instruction for the data A' of the third instruction 430. In this case, the third instruction 430 and the fifth instruction 450 are associated with the data A', and the fifth instruction 450 is dependent on the third instruction 430.

On the other hand, each of the fourth instruction 440 and the sixth instruction 460 is associated with data B and data C, and accordingly, may be determined not to be dependent on the first instruction 410, the second instruction 420, the third instruction 430, and the fifth instruction 450 which are directly or indirectly associated with the data A.

Figure 5:
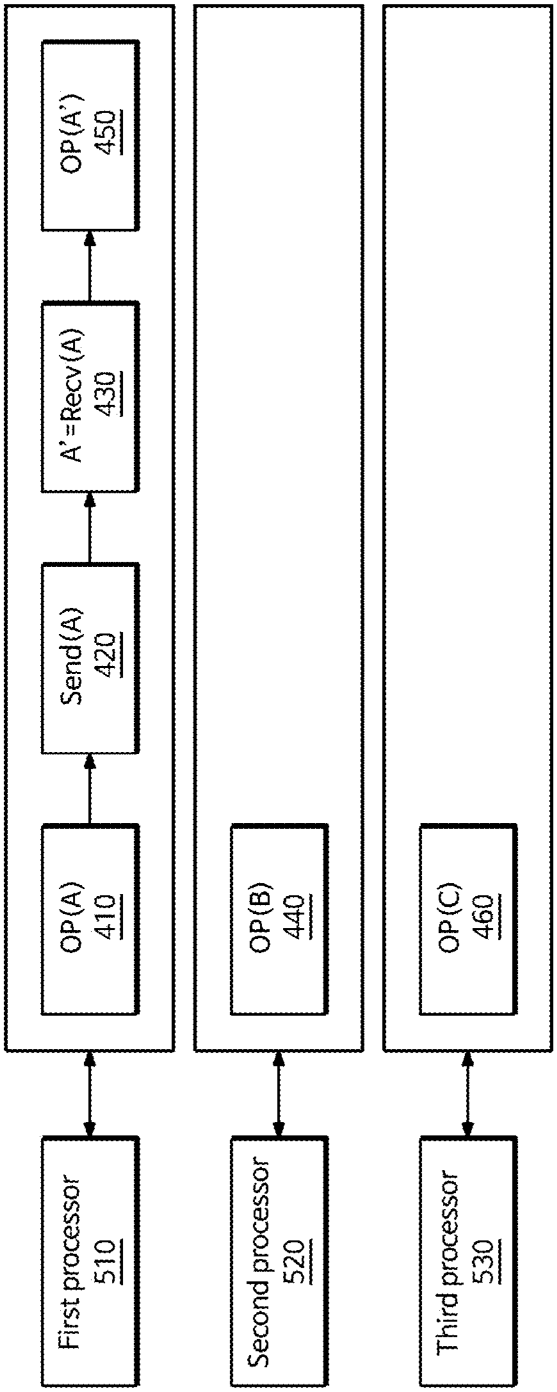
FIG. 5 is a diagram illustrating an example in which a plurality of instructions are assigned to processors.

FIG. 5 is a diagram illustrating an example in which the plurality of instructions 410, 420, 430, 440, 450, and 460 are assigned to processors 510, 520, and 530.

The plurality of instructions 410, 420, 430, 440, 450, and 460 assigned to the processors 510, 520, and 530 are instructions associated with the intermediate representation graph 400 of FIG. 4 and this will be described below except those already illustrated and described in FIG. 4.

The instructions may be assigned to each of the processors 510, 520, and 530 such that the dependent instructions are sequentially executed.

For example, the instructions may be assigned to the first processor 510 such that the first instruction 410, the second instruction 420 dependent on the first instruction 410, the third instruction 430 dependent on the second instruction 420, and the fifth instruction 450 dependent on the third instruction 430 are sequentially executed.

On the other hand, the fourth instruction 440 and the sixth instruction 460, which are not dependent on the other instructions, may be assigned to the second processor 520 and the third processor 530, respectively. In other words, instructions that are not dependent on each other may be processed in parallel in each of different processors.

Figure 6:
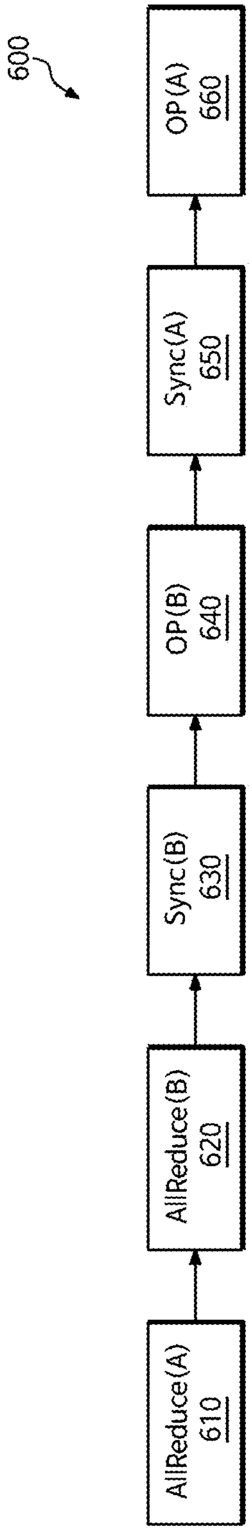
FIG. 6 is a diagram illustrating an example of an intermediate representation graph.

FIG. 6 is a diagram illustrating an example of an intermediate representation graph 600.

The intermediate representation graph 600 may be generated based on a source program and may include information associated with a predetermined number of instructions. For example, the intermediate representation graph 600 illustrated in FIG. 6 includes information associated with six instructions 610, 620, 630, 640, 650, and 660.

The first instruction 610 may correspond to a collective communication instruction associated with the data A (e.g., tensor, etc.), and the second instruction 620 may correspond to a collective communication instruction associated with data B (e.g., tensor, etc.) Each of the first instruction 610 and the second instruction 620 may correspond to instructions for combining values using a specified operation (e.g., sum operation, average operation, etc.) on tensors associated with A or B.

On the other hand, each of the third instruction 630 and the fifth instruction 650 may correspond to an instruction for synchronizing nodes based on the result of the operation of the first instruction 610 or the second instruction 620, and each of the fourth instruction 640 and the sixth instruction 660 may correspond to an operation instruction performed on data B or data A updated by AllReduce instruction and Sync instruction.

The intermediate representation graph 600 illustrated in FIG. 6 may be a graph rearranged to minimize unnecessary synchronization. For example, if the third instruction 630 that is a synchronization instruction associated with the data B is executed after the first instruction 610 and the second instruction 620 are executed, synchronization associated with the data A can be automatically ensured, and accordingly, execution of the fifth instruction 650 that is a synchronization instruction for the data A may be omitted. That is, the execution of the fifth instruction 650 is inevitable before the rearrangement of the graph, but the execution of the fifth instruction 650 may be omitted according to the result of rearrangement.

With this configuration, the intermediate representation graph may be rearranged and unnecessary synchronization processes can be reduced, thereby reducing resources and costs required by synchronization.

Figure 7:
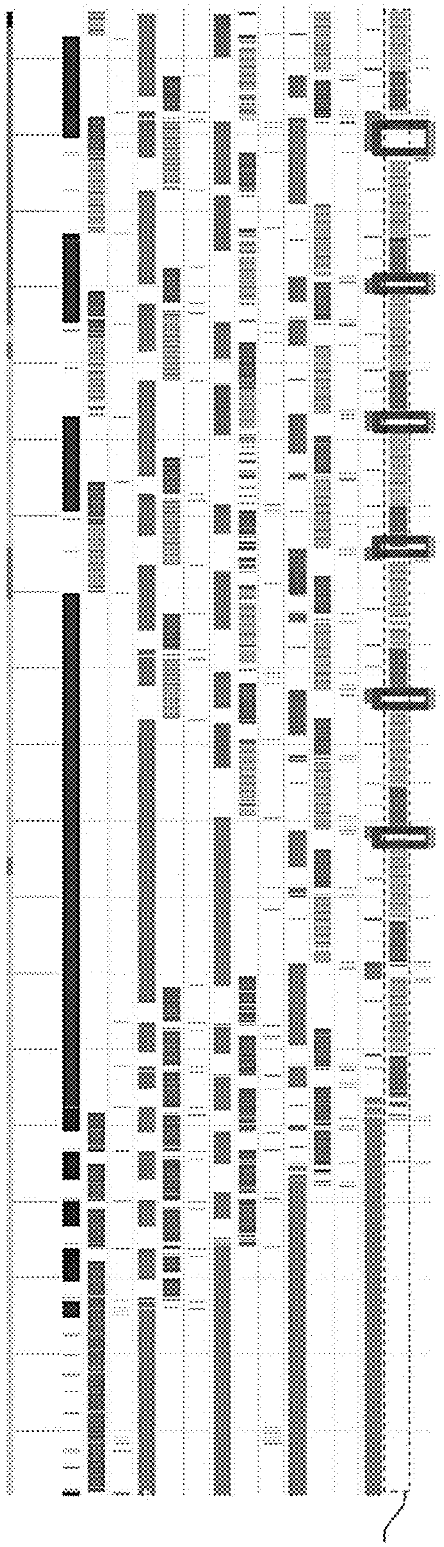
FIG. 7 is a diagram illustrating an example of a processor execution timeline when compiling for overlapping instructions is not applied.
Figure 8:
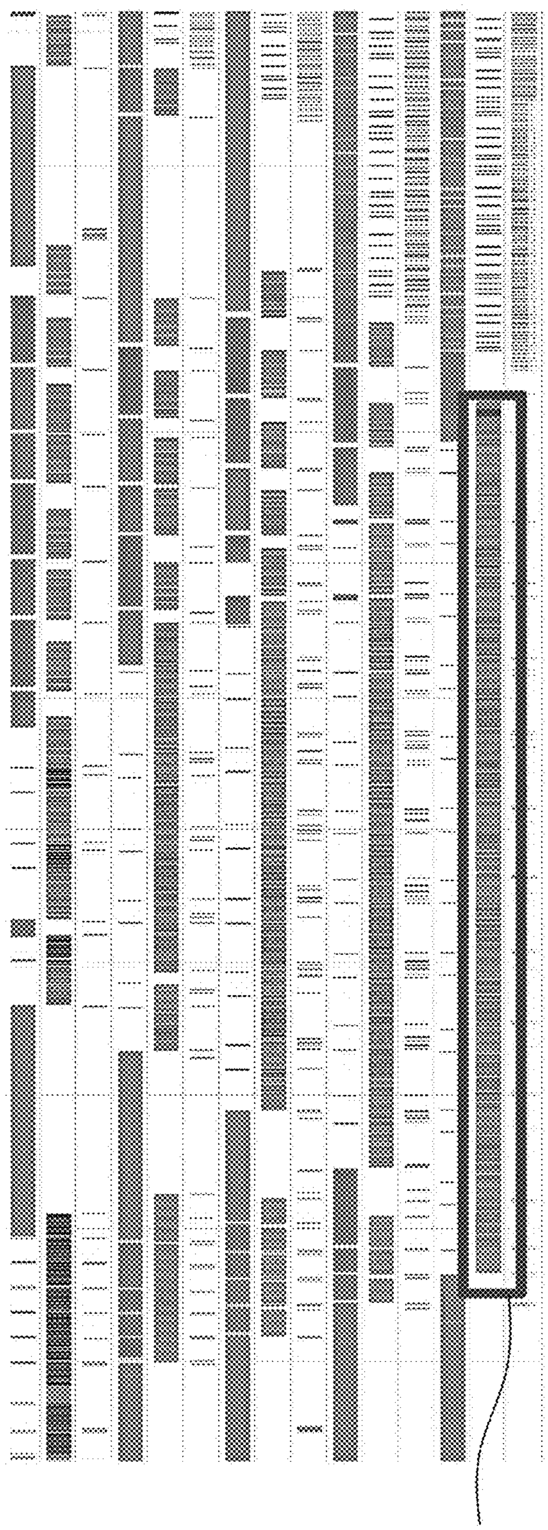
FIG. 8 is a diagram illustrating an example of a processor execution timeline when compiling for overlapping instructions is applied.

FIG. 7 is a diagram illustrating an example of an execution timeline 700 of a processor when the compiling for overlapping instructions is not applied, and FIG. 8 is a diagram illustrating an example of an execution timeline 800 of a processor when the compiling for overlapping instructions is applied.

Each of the execution timelines 700 and 800 may be a visual representation of the degree of use or occupancy of the processor over time in a parallel or distributed computing system. With this configuration, the degree of resource utilization, inactive period of the system, etc. may be easily identified.

The horizontal axis of each of the execution time lines 700 and 800 may represent time, and the vertical axis may represent various processors, cores, etc. of the system. A bar or line is drawn along the time axis to indicate period of time in which the processor is active or performing a task, and the length of the bar may represent the task period.

Referring to FIG. 7, it can be seen that, when the compiling for overlapping instructions is not applied, there occurs a temporal blank (indicated by six rectangles in a region 710) during which the processor is not utilized.

The temporal blank in the region 710 may occur for various reasons, such as when the processor is waiting for data synchronization with or data reception from another processor, or when overhead in task management occurs. That is, when the compiling for overlapping instructions is not applied, the task execution time of the processor may be reduced, and the processor may be utilized inefficiently.

On the other hand, when the compiling for overlapping instructions is applied as in FIG. 8, unlike in FIG. 7, it can be seen that the temporal blank during which the processor is not utilized while waiting for execution of a dependent instruction does not occur (810). That is, the communication overhead etc. is reduced by applying the compiling for overlapping instructions, so that the processor can be efficiently utilized.

Figure 9:
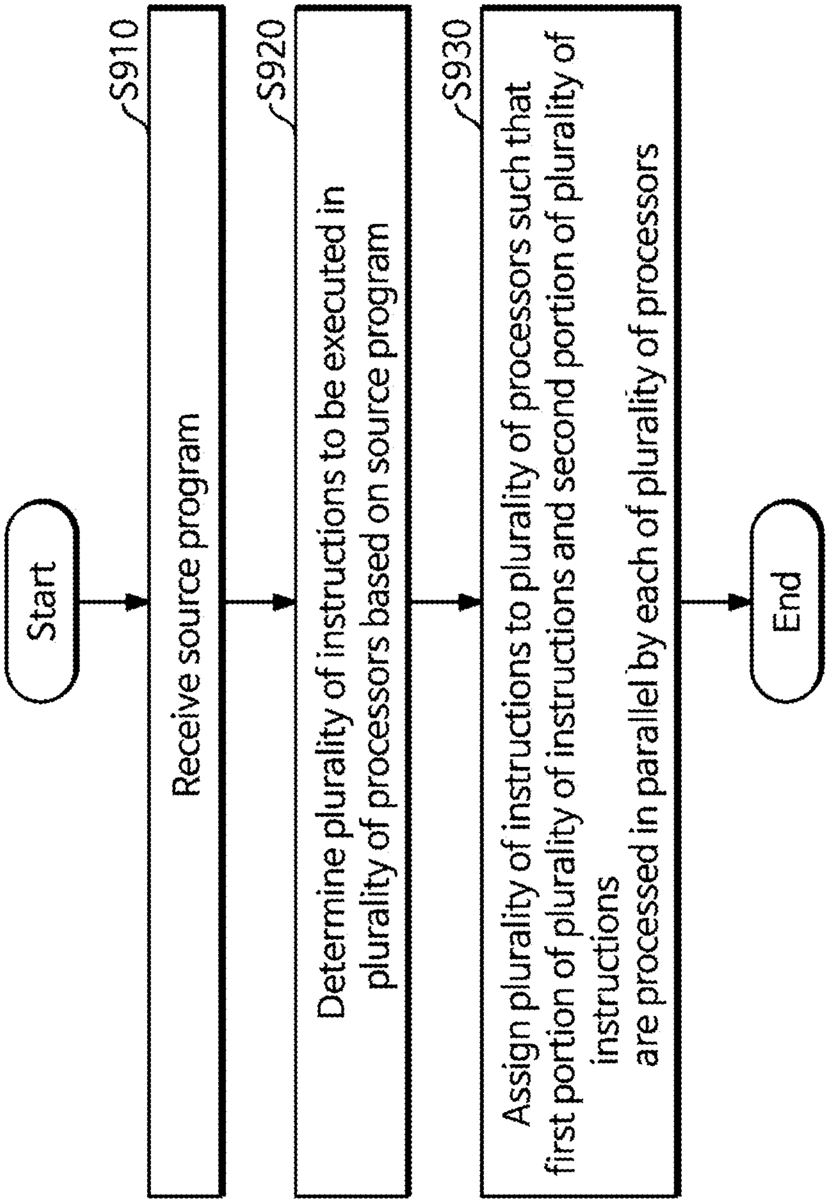
FIG. 9 is a flowchart illustrating a method for compiling for overlapping instructions between a plurality of processors.

FIG. 9 is a flowchart illustrating a method 900 for compiling for overlapping instructions between a plurality of processors. The method 900 for compiling for overlapping instructions between a plurality of processors may be performed by a processor (e.g., one or more processors of a computing device such as a user terminal or an information processing system).

The method 900 for compiling for overlapping instructions between a plurality of processors may be initiated by a processor receiving a source program, at S910.

The processor may determine a plurality of instructions to be executed in the plurality of processors based on the source program, at S920.

The processor may determine a plurality of instructions based on model parallelism. For example, the processor may determine a plurality of instructions based on pipeline parallelism in which a layer of a model is divided and processed by each of a plurality of processors and/or tensor model parallelism in which tensors of a model are divided and processed by each of a plurality of processors, etc. Additionally or alternatively, a plurality of instructions may be determined by data parallelism in which an input tensor is divided and inputted.

The processor may assign the plurality of instructions to the plurality of processors such that a first portion of the plurality of instructions and a second portion of the plurality of instructions are processed in parallel by each of the plurality of processors, at S930.

The processor may determine dependency among a plurality of instructions to be executed. The processor may assign a plurality of instructions to the plurality of processors based on the determined dependency. For example, the processor may assign the first instruction and the second instruction to a plurality of processors such that the first instruction of the plurality of instructions and the second instruction of the plurality of instructions, which is not dependent on the first instruction are processed in parallel by each of the plurality of processors.

The processor may determine an intermediate representation associated with the plurality of instructions to be executed. The processor may determine dependency between the instructions to be executed based on the intermediate representation. The intermediate representation may include information associated with a predetermined number of instructions of a plurality of instructions to be executed, and the intermediate representation may be an intermediate representation graph associated with the plurality of instructions to be executed.

The processor may classify at least a portion of the plurality of instructions to be executed into an operation instruction, and a communication instruction associated with data transmission and reception between the plurality of processors. The processor may assign the operation instruction and the communication instruction to the plurality of processors such that a third portion of the operation instruction and a fourth portion of the communication instruction are processed in parallel by each of the plurality of processors.

The flowchart illustrated in FIG. 9 and the above description are merely examples, and may be implemented differently in some other examples. For example, in some examples, the order of respective steps may be changed, some steps may be repeatedly performed, some steps may be omitted, or some steps may be added.

Figure 10:
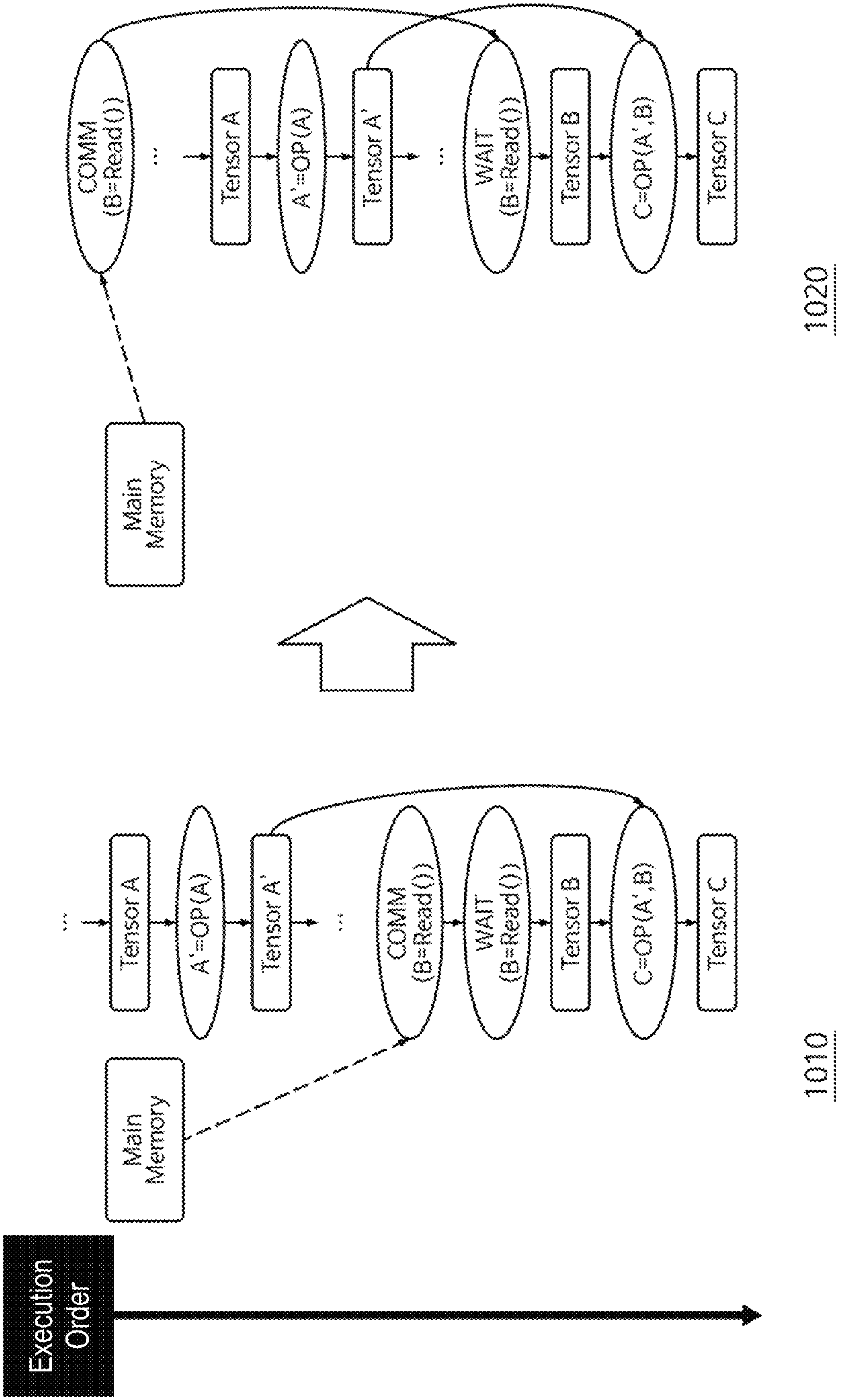
FIG. 10 is a diagram illustrating an example in which instructions of an intermediate representation graph are rearranged.

FIG. 10 is a diagram illustrating an example in which instructions of an intermediate representation graph are rearranged. The communication instructions included in intermediate representation graphs 1010 and 1020 may include an instruction for starting communication (COMM) and an instruction for waiting for communication to end (WAIT). In this case, the communication instruction may be an instruction (e.g., send/recv) associated with one-to-one communication and/or an instruction (e.g., broadcast, gather, scatter, reduction, etc.) associated with collective communication.

As illustrated in FIG. 10, if the intermediate representation graph 1010 includes the COMM instruction and the WAIT instruction, the intermediate representation graph 1020 may be generated as a result of compilation, which is rearranged such that an instruction not dependent on the COMM instruction and the WAIT instruction are positioned between the COMM instruction and the WAIT instruction. For example, as illustrated, tensor B of the intermediate representation graph 1010 has dependency on an instruction for generating tensor C, but has no dependency on an instruction associated with tensor A. Therefore, the intermediate representation graph 1010 may be rearranged such that instructions associated with tensor A are positioned after COMM (B=Read( )) instruction is executed and before tensor B is generated (that is, before the WAIT instruction).

In the rearranged intermediate representation graph 1020, the instruction to be positioned between the COMM instruction and the WAIT instruction may be determined based on the execution time of the instruction. For example, the instruction to be positioned between the COMM instruction and the WAIT instruction may be determined so that the difference between the total execution time of the instruction positioned between the COMM instruction and the WAIT instruction and the execution time of the COMM instruction and the WAIT instruction is less than a predetermined threshold time. Through this, the communication instruction and the instruction positioned between the COMM instruction and the WAIT instruction can be processed in parallel in different processors, thereby minimizing communication overhead between the processors.

The execution time of the instruction to be positioned between the COMM instruction and the WAIT instruction may be profiled in advance before execution of the instruction (e.g., when a framework is installed). For example, data associated with the execution time of the instruction according to the size of input data may be collected using a cost model, etc., and the instruction to be positioned between the COMM instruction and the WAIT instruction may be determined based on the collected data. Alternatively, a process of extracting one instruction from a list of instructions not dependent on the COMM instruction and the WAIT instruction and executing the extracted instruction may be repeated until the execution of the COMM instruction ends, so that the instructions may be substantially rearranged.

A list including instructions associated with tensor A of the intermediate representation graph 1020 (that is, instructions not dependent on the COMM instruction and the WAIT instruction) may be generated at a compile time, and the generated list may be transferred to a runtime system (worker) together with a call list of the intermediate representation graph 1020. At this time, the runtime system may extract one instruction from the call list and transfers the extracted instruction to the execution device for the execution of the instruction. If the COMM instruction is executed, a cycle in which the instructions in the list transferred to the runtime system are extracted and executed one by one may be repeated until the execution of the COMM instruction ends. Through this, the rearrangement of the call list can be performed dynamically.

In another example, if a communication instruction is included in a subsequent intermediate representation graph of a specific intermediate representation graph of a plurality of generated intermediate representation graphs, and if the communication instruction has no dependency on the instruction in the specific intermediate representation graph, the communication instruction may be executed in parallel while the instruction in the specific intermediate representation graph is executed. In this case, the communication instruction of the subsequent intermediate representation graph is immediately executed at the compile time, and the WAIT instruction of the corresponding communication instruction may be inserted into the subsequent intermediate representation graph. Through this, overlapping of communication instructions and operation instructions may occur over several intermediate representation graphs.

On the other hand, among a "sender" that transfers data and a "receiver" that receives data on the communication system, the receiver may receive all data received from the other positions through a separate process with a unique ID. At this time, the unique ID may be assigned by the compiler to all tensors on the intermediate representation graph. The runtime system of the receiver may execute the call list, while checking whether the transmission is complete based on the unique ID (WAIT), and if it is determined that the transmission is complete, may continuously execute the call list using the corresponding unique ID. Through this, in a handshaking protocol between the sender and the receiver, it is possible to prevent a communication delay problem or inefficiency caused due to start of the communication, from the time when both the sender process and the receiver process call the API.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The commands may be executable by one or more processors, and may cause the processor(s) to perform certain aspects of the functions described in the disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the disclosure may be implemented in multiple processing chips or devices, and storage may be similarly influenced across a plurality of devices. Such devices may include PCs, network servers, and portable devices.

Although the disclosure has been described in connection with some examples herein, various modifications and changes can be made without departing from the scope of the disclosure, which can be understood by those skilled in the art to which the disclosure pertains. In addition, such modifications and changes should be considered within the scope of the claims appended herein.

The invention claimed is:

1. A method performed by one or more processors, the method comprising:

receiving a source program;

determining, based on the source program, a plurality of instructions to be executed in a plurality of processors;

generating an intermediate representation graph corresponding to the plurality of instructions to be executed in the plurality of processors;

based on the intermediate representation graph, identifying, in the plurality of instructions:

a communication start-instruction associated with data transmission, and a wait instruction corresponding to waiting for the data transmission to end;

rearranging the intermediate representation graph by inserting, after the communication start-instruction and before the wait instruction, one or more operation instructions such that a difference between a total execution time of the one or more operation instructions and a first execution time corresponding to the communication instruction and the wait instruction is less than a predetermined threshold time; and assigning, based on the rearranged intermediate representation graph, the plurality of instructions to the plurality of processors such that a first portion of the plurality of instructions and a second portion of the plurality of instructions are processed in parallel by at least two processors of the plurality of processors.

2. The method according to claim 1, further comprising determining a dependency between the plurality of instructions, wherein the assigning the plurality of instructions to the plurality of processors comprises assigning, based on the determined dependency, the plurality of instructions to the plurality of processors.

3. The method according to claim 2, wherein the assigning the plurality of instructions to the plurality of processors comprises assigning a first instruction of the plurality of instructions and a second instruction of the plurality of instructions which is not dependent on the first instruction to a set of the plurality of processors such that the first instruction and the second instruction are processed in parallel by the set of the plurality of processors.

4. The method according to claim 2, wherein the determining the dependency between the plurality of instructions comprises:

determining, based on the intermediate representation graph, the dependency between the plurality of instructions.

5. The method according to claim 1, wherein the intermediate representation graph comprises information associated with a predetermined number of instructions of the plurality of instructions.

6. The method according to claim 1, further comprising:

determining, based on a cost model, the first predicted execution time.

7. The method according to claim 1, wherein the assigning the plurality of instructions to the plurality of processors comprises assigning the one or more operation instructions to a first processor of the plurality of processors and the communication start instruction to a second processor of the plurality of processors.

8. The method according to claim 1, wherein the determining the plurality of instructions comprises determining, based on parallel processing, the plurality of instructions.

9. An apparatus comprising:
one or more processors; and
memory storing instructions that, when executed by the one or more processors, cause the apparatus to:
receive a source program;
determine, based on the source program, a plurality of instructions to be executed in a plurality of processors;
generate an intermediate representation graph corresponding to the plurality of instructions to be executed in the plurality of processors;
based on the intermediate representation graph, identify, in the plurality of instructions:
a communication instruction associated with data transmission, and
a wait instruction corresponding to waiting for the data transmission to end;
rearrange the intermediate representation graph by inserting, after the communication instruction and before the wait instruction, one or more operation instructions such that a difference between a total execution time of the one or more operation instructions and a first execution time corresponding to the communication instruction and the wait instruction is less than a predetermined threshold time; and
assign, based on the rearranged intermediate representation graph, the plurality of instructions to the plurality of processors such that a first portion of the plurality of instructions and a second portion of the plurality of instructions are processed in parallel by at least two processors of the plurality of processors.

10. The apparatus according to claim 9, wherein the instructions, when executed by the one or more processors, further cause the apparatus to determine a dependency between the plurality of instructions, and wherein the instructions, when executed by the one or more processors, cause the apparatus to assign the plurality of instructions to the plurality of processors by causing the apparatus to assign, based on the determined dependency, the plurality of instructions to the plurality of processors.

11. The apparatus according to claim 10, wherein the instructions, when executed by the one or more processors, cause the apparatus to assign the plurality of instructions to the plurality of processors by causing the apparatus to assign a first instruction of the plurality of instructions and a second instruction of the plurality of instructions which is not dependent on the first instruction to a set of the plurality of processors such that the first instruction and the second instruction are processed in parallel by the set of the plurality of processors.

12. The apparatus according to claim 10, wherein the instructions, when executed by the one or more processors, further cause the apparatus to determine the dependency between the plurality of instructions by causing the apparatus to:
determine, based on the intermediate representation graph, the dependency between the plurality of instructions.

13. The apparatus according to claim 9, wherein the intermediate representation graph comprises information associated with a predetermined number of instructions of the plurality of instructions.

14. The apparatus according to claim 9, wherein the instructions, when executed by the one or more processors, further cause the apparatus to:
determine, based on a cost model, the first execution time corresponding to the communication instruction and the communication instruction.

15. The apparatus according to claim 9, wherein the instructions, when executed by the one or more processors, further cause the apparatus to assign the plurality of instructions to the plurality of processors by causing the apparatus to assign the one or more operation instructions to a first processor of the plurality of processors and the communication instruction to a second processor of the plurality of processors.

16. The apparatus according to claim 9, wherein the instructions, when executed by the one or more processors, further cause the apparatus to determine the plurality of instructions by causing the apparatus to determine, based on parallel processing, the plurality of instructions.

17. One or more non-transitory computer-readable media storing instructions that, when executed, cause an apparatus to:
receive a source program;
determine, based on the source program, a plurality of instructions to be executed in a plurality of processors;
generate an intermediate representation graph corresponding to the plurality of instructions to be executed in the plurality of processors;
based on the intermediate representation graph, identify, in the plurality of instructions:
a communication instruction associated with data transmission by, and
a wait instruction corresponding to waiting for the data transmission to end;
rearrange the intermediate representation graph by inserting, after the communication instruction and before the wait instruction, one or more operation instructions such that a difference between a total execution time of the one or more operation instructions and a first execution time corresponding to the communication instruction and the wait instruction is less than a predetermined threshold time; and
assign, based on the rearranged intermediate representation graph, the plurality of instructions to the plurality of processors such that a first portion of the plurality of instructions and a second portion of the plurality of instructions are processed in parallel by at least two processors of the plurality of processors.

18. The one or more non-transitory computer-readable media according to claim 17, wherein the instructions, when executed, further cause the apparatus to determine a dependency between the plurality of instructions, and wherein the instructions, when executed by the one or more processors, cause the apparatus to assign the plurality of instructions to the plurality of processors by causing the apparatus to assign, based on the determined dependency, the plurality of instructions to the plurality of processors.

19. The one or more non-transitory computer-readable media according to claim 18, wherein the instructions, when executed, cause the apparatus to assign the plurality of instructions to the plurality of processors by causing the apparatus to assign a first instruction of the plurality of instructions and a second instruction of the plurality of instructions which is not dependent on the first instruction to a set of the plurality of processors such that the first instruction and the second instruction are processed in parallel by the set of the plurality of processors.

20. The one or more non-transitory computer-readable media according to claim 18, wherein the instructions, when executed, further cause the apparatus to determine the dependency between the plurality of instructions by causing the apparatus to:

determine, based on the intermediate representation graph, the dependency between the plurality of instructions.

* * * * *